(12) United States Patent
Jung

(10) Patent No.: US 11,239,911 B2
(45) Date of Patent: Feb. 1, 2022

(54) DISPLAY APPARATUS AND CONTROL METHOD FOR DISPLAY APPARATUS

(71) Applicant: SAMSUNG ELECTRONICS CO., LTD., Suwon-si (KR)

(72) Inventor: Jaewoong Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/970,166

(22) PCT Filed: Feb. 11, 2019

(86) PCT No.: PCT/KR2019/001619
§ 371 (c)(1),
(2) Date: Aug. 14, 2020

(87) PCT Pub. No.: WO2019/182247
PCT Pub. Date: Sep. 26, 2019

(65) Prior Publication Data
US 2021/0105068 A1    Apr. 8, 2021

(30) Foreign Application Priority Data

Mar. 23, 2018  (KR) ........................ 10-2018-0034105

(51) Int. Cl.
*H04B 10/00* (2013.01)
*H04B 10/079* (2013.01)
(Continued)

(52) U.S. Cl.
CPC .......... *H04B 10/0795* (2013.01); *G06F 3/14* (2013.01); *H04B 10/25751* (2013.01)

(58) Field of Classification Search
CPC combination set(s) only.
See application file for complete search history.

(56) References Cited

U.S. PATENT DOCUMENTS 5,623,355 A * 4/1997 Olsen .................. H01S 5/06835
398/162
5,801,860 A * 9/1998 Yoneyama .......... H04J 14/0221
398/197

(Continued)

FOREIGN PATENT DOCUMENTS

JP    2017-183954 A    10/2017
JP       6217294 B2    10/2017
(Continued)

OTHER PUBLICATIONS

Communication dated Jan. 26, 2021 by the European Patent Office in corresponding European Application No. 19772158.2.
(Continued)

*Primary Examiner* — Agustin Bello
(74) *Attorney, Agent, or Firm* — Sughrue Mion, PLLC

(57) ABSTRACT

A display apparatus is disclosed. The display apparatus includes: an optical communication interface configured to communicate with an electronic device through an optical cable; and a processor for, when an optical signal including at least one signal among an image signal and a sound signal is received from the electronic device through the optical communication interface, measuring a strength of the received optical signal, and controlling an operation of the display apparatus related to a state of the optical cable, on the basis of the measured strength of the optical signal.

11 Claims, 12 Drawing Sheets

(51) Int. Cl.
*G06F 3/14* (2006.01)
*H04B 10/2575* (2013.01)

(56) References Cited

U.S. PATENT DOCUMENTS

| | | | | |
|---|---|---|---|---|
| 5,822,099 | A * | 10/1998 | Takamatsu | H04B 10/1127 398/162 |
| 7,102,648 | B1 * | 9/2006 | Holub | G06F 3/14 345/589 |
| 7,113,708 | B1 * | 9/2006 | Creaney | H04B 10/07955 398/140 |
| 7,352,289 | B1 * | 4/2008 | Harris | H04Q 9/00 324/500 |
| 7,401,985 | B2 * | 7/2008 | Aronson | G02B 6/4416 385/89 |
| 9,166,367 | B2 * | 10/2015 | Zhu | H01S 3/131 |
| 9,197,324 | B1 * | 11/2015 | Bhoja | H04B 10/564 |
| 9,350,459 | B2 | 5/2016 | Morita et al. | |
| 9,389,949 | B1 * | 7/2016 | Campbell | G06F 11/1004 |
| 10,142,027 | B2 * | 11/2018 | Hyakudai | H04B 10/501 |
| 10,270,541 | B2 * | 4/2019 | Morris | H04L 1/08 |
| 10,587,341 | B2 * | 3/2020 | Nakayama | H01R 13/6683 |
| 2002/0196430 | A1 * | 12/2002 | May | H04J 14/02 356/213 |
| 2005/0105900 | A1 * | 5/2005 | Akimoto | H04B 10/03 398/16 |
| 2005/0105913 | A1 * | 5/2005 | Ozeki | H04B 10/564 398/140 |
| 2006/0077778 | A1 * | 4/2006 | Tatum | G02B 6/4246 369/44.11 |
| 2007/0058976 | A1 * | 3/2007 | Tatum | G02B 6/4246 398/99 |
| 2007/0264862 | A1 * | 11/2007 | Hallberg | H04N 21/4424 439/489 |
| 2008/0267621 | A1 * | 10/2008 | Sheth | H04B 10/40 398/25 |
| 2009/0167946 | A1 * | 7/2009 | Samada | G09G 5/006 348/558 |
| 2011/0135311 | A1 * | 6/2011 | Enami | H04B 10/508 398/135 |
| 2011/0150401 | A1 * | 6/2011 | Furuyama | H04B 10/801 385/89 |
| 2012/0080954 | A1 * | 4/2012 | Gachon | G06F 3/14 307/80 |
| 2012/0086935 | A1 * | 4/2012 | Smith | H04B 10/073 356/73.1 |
| 2012/0274858 | A1 * | 11/2012 | Doi | H04N 5/765 348/723 |
| 2013/0128124 | A1 * | 5/2013 | Suzuki | H04N 5/44 348/723 |
| 2013/0148962 | A1 * | 6/2013 | Heimbuch | H04B 10/0799 398/38 |
| 2013/0183045 | A1 * | 7/2013 | Niiho | H04B 10/25 398/142 |
| 2014/0186031 | A1 * | 7/2014 | Benner | H04B 10/07 398/38 |
| 2015/0280813 | A1 | 10/2015 | Lee | |
| 2015/0346448 | A1 | 12/2015 | Wu | |
| 2016/0087400 | A1 * | 3/2016 | Zhu | H01S 5/183 372/38.02 |
| 2017/0041886 | A1 * | 2/2017 | Baker | H04W 4/80 |
| 2017/0270330 | A1 * | 9/2017 | Albrecht | H04L 61/6022 |
| 2018/0219631 | A1 * | 8/2018 | Shiraishi | H04B 10/50577 |
| 2019/0280768 | A1 * | 9/2019 | Son | H04B 10/071 |
| 2019/0379452 | A1 * | 12/2019 | Miki | H04B 10/07955 |
| 2021/0105068 | A1 * | 4/2021 | Jung | G06F 3/14 |
| 2021/0194595 | A1 * | 6/2021 | Gohel | H03F 3/189 |

FOREIGN PATENT DOCUMENTS

| | | |
|---|---|---|
| KR | 10-0483483 B1 | 4/2005 |
| KR | 10-2011-0038317 A | 4/2011 |
| KR | 10-2013-0113161 A | 10/2013 |
| KR | 10-2015-0011253 A | 1/2015 |
| KR | 10-1484267 B1 | 1/2015 |
| KR | 10-2015-0113730 A | 10/2015 |

OTHER PUBLICATIONS

International Search Report dated May 17, 2019 issued by the International Searching Authority in counterpart International Application No. PCT/KR2019/001619 (PCT/ISA/210).

International Written Opinion dated May 17, 2019 issued by the International Searching Authority in counterpart International Application No. PCT/KR2019/001619 (PCT/ISA/237).

* cited by examiner

DISPLAY APPARATUS AND CONTROL METHOD FOR DISPLAY APPARATUS

CROSS-REFERENCE TO RELATED APPLICATIONS

This application is a National Stage of International Application No. PCT/KR2019/001619, filed Feb. 11, 2019, claiming priority based on Korean Patent Application No. 10-2018-0034105, filed Mar. 23, 2018, the contents of all of which are incorporated herein by reference in their entirety.

BACKGROUND ART

Technical Field

The disclosure relates to a display apparatus and a control method for the display apparatus, and more particularly, to a display apparatus that communicates with an electronic device through an optical cable, and a control method for the display apparatus.

Description of the Related Art

Recently, a TV includes various kinds of connection ports or terminals and is connected with a set top box, an Internet network, a cable network, an external hard disk, various kinds of AV devices, etc., and can perform various functions. Like this, functions of a TV have been diversified, but there is a problem that various kinds of connection lines connected to a TV do not look good aesthetically, and it is difficult to organize them.

For resolving such a problem, an optical communication technology is being applied to a TV system recently. Optical communication is a communication method of transmitting and receiving information by using total internal reflection of a laser light through an optical fiber. Through optical communication, high speed data transmission and reception is possible by using a frequency band wherein the thickness of a cable is thin and wide. Thus, recently, a system wherein various kinds of ports or terminals included in a TV are provided on a separate electronic device, and the electronic device and the TV are connected only by an optical cable has appeared.

In this case, for example, when an image and a sound which are electronic signals are converted into an optical signal at an electronic device and transmitted to a TV, the TV converts the received optical signal into an electronic signal again and outputs the signal.

Here, in case an optical cable connecting the electronic device and the TV is bent at an angle smaller than a bending limit angle or a momentary shock is applied to the optical cable, the strength of an optical signal transmitted through the optical cable is reduced, and degradation of quality such as momentary cracking of the TV screen or breaking-up of a sound may occur.

FIG. 1 is a diagram illustrating an example wherein, when a TV and an electronic device are connected by an optical cable, the strength of an optical signal received at the TV varies according to a method of organizing the remaining portion of the optical cable by a user. For example, if the strength of an optical signal at which a system normally operates is greater than or equal to 350 mV, unlike the cases of (a) and (d) in FIG. 1 wherein the bending angles are relatively big, in the cases of (b) and (c) in FIG. 1 wherein there are portions bent at smaller angles than a bending limit angle, the strength of optical signals received at the TV is reduced to 280 mV and 250 mV even though optical signals are transmitted at the same strength from the electronic device.

Obviously, a separate guide for maintaining a minimum radius curvature of an optical cable is provided when a system is installed, but depending on environments, conditions for installation according to the guide may not be satisfied, and in case stability of a transmission signal is not secured like a case wherein an electronic device is momentarily moved while a system is used, the aforementioned phenomenon of cracking of a screen or breaking-up of a sound may occur.

Meanwhile, in case an optical cable is curved excessively, a defect may occur in the optical cable, and in this case, the location wherein the breakdown occurred may not be recognized correctly and the breakdown may be misunderstood as the breakdown of a TV, and a repair service for the TV may be requested.

DETAILED DESCRIPTION OF THE INVENTION

Technical Problem

The disclosure is for addressing the aforementioned problem, and the purpose of the disclose is in providing a display apparatus that performs an operation related to the state of an optical cable according to the strength of an optical signal including image and sound signals and a control method for the display apparatus.

Technical Solution

A display apparatus according to an embodiment of the disclosure for achieving the aforementioned purpose includes an optical communication interface configured to communicate with an electronic device through an optical cable and a processor configured to, based on an optical signal including at least one signal among an image signal and a sound signal being received from the electronic device through the optical communication interface, measure a strength of the received optical signal, and control an operation of the display apparatus related to a state of the optical cable based on the measured strength of the optical signal.

Also, the processor may, based on the measured strength of the optical signal being smaller than a first threshold value, transmit a control signal for increasing a strength of transmission of the optical signal of the electronic device to the electronic device.

In addition, the display apparatus may further include an outputter, and the processor may, based on the measured strength of the optical signal being smaller than a second threshold value, output a notification indicating that the optical cable is defective through the outputter.

Also, the display apparatus may further include an outputter, and the processor may, based on the measured strength of the optical signal being smaller than the first threshold value and greater than or equal to the second threshold value, transmit a control signal for increasing a strength of transmission of the optical signal of the electronic device to the electronic device, and based on the measured strength of the optical signal being smaller than the second threshold value, output a notification indicating that the optical cable is defective through the outputter.

Further, the optical communication interface may include a plurality of channels, and the processor may measure the strength of optical signals of each of the plurality of channels, sum up the measured strength of the optical signals of each of the plurality of channels, and control the operation of the display apparatus based on the summed up strength of the optical signals.

Also, the processor may, based on the strength of the optical signal measured after transmitting the control signal to the electronic device being identical to the strength of the optical signal measured before transmitting the control signal to the electronic device, determine that the optical cable is defective.

In addition, the display apparatus may include a communicator configured to communicate with a user terminal apparatus, and the processor may, based on the measured strength of the optical signal being smaller than the second threshold value, control the communicator to transmit a message informing that the optical cable is defective to the user terminal apparatus.

Meanwhile, a method for controlling a display apparatus including an optical communication interface configured to communicate with an electronic device through an optical cable according to an embodiment of the disclosure includes the steps of receiving an optical signal including at least one signal among an image signal and a sound signal from the electronic device, measuring a strength of the received optical signal, and controlling an operation of the display apparatus related to a state of the optical cable based on the measured strength of the optical signal.

Also, the controlling step may include the step of, based on the measured strength of the optical signal being smaller than a first threshold value, transmitting a control signal for increasing a strength of transmission of the optical signal of the electronic device to the electronic device.

In addition, the controlling step may include the step of, based on the measured strength of the optical signal being smaller than a second threshold value, outputting a notification indicating that the optical cable is defective.

Further, in the controlling step, based on the measured strength of the optical signal being smaller than the first threshold value and greater than or equal to the second threshold value, a control signal for increasing a strength of transmission of the optical signal of the electronic device may be transmitted to the electronic device, and based on the measured strength of the optical signal being smaller than the second threshold value, a notification indicating that the optical cable is defective may be output.

Also, the optical communication interface may include a plurality of channels, and in the measuring step, the strength of optical signals of each of the plurality of channels may be measured, and the measured strength of the optical signals of each of the plurality of channels may be summed up, and in the controlling step, the operation of the display apparatus may be controlled based on the summed up strength of the optical signals.

In addition, the control method may further include the step of, based on the strength of the optical signal measured after transmitting the control signal to the electronic device being identical to the strength of the optical signal measured before transmitting the control signal to the electronic device, determining that the optical cable is defective.

Also, the controlling step may include the step of, based on the measured strength of the optical signal being smaller than the second threshold value, transmitting a message informing that the optical cable is defective to a user terminal apparatus.

Meanwhile, a display system according to an embodiment of the disclosure may include an electronic device which converts at least one signal among an image signal and a sound signal into an optical signal, and transmits the converted optical signal to a display apparatus through an optical cable, and a display apparatus which, based on receiving the converted optical signal from the electronic device through the optical cable, converts the received optical signal and outputs at least one signal among the image signal and the sound signal. The display apparatus may, based on receiving the optical signal, measure a strength of the received optical signal, and perform an operation related to a state of the optical cable based on the measured strength of the optical signal.

Effect of the Invention

According to the various embodiments of the disclosure as described above, reduction of the strength of an optical signal according to bending of an optical cable in a display system can be compensated. Also, a defect of an optical cable can be determined.

MODE FOR IMPLEMENTING THE INVENTION

Figure 1:
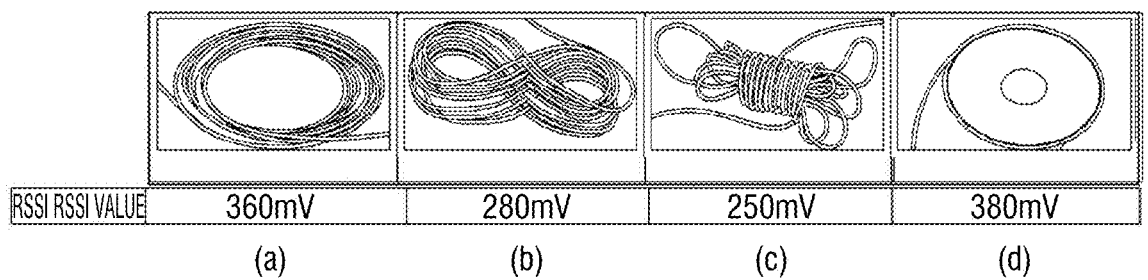
FIG. 1 is an exemplary diagram illustrating the strength of an optical signal according to a method of organizing an optical cable.

Hereinafter, the various embodiments of the disclosure will be described with reference to the drawings. However, it should be noted that the various embodiments are not for limiting the technology described in the disclosure to a specific embodiment, but they should be interpreted to include various modifications, equivalents, and/or alternatives of the embodiments of the disclosure. Also, with respect to the detailed description of the drawings, similar components may be designated by similar reference numerals.

In the disclosure, terms such as "have," "may have," "include," and "may include" should be construed as denoting that there are such characteristics (e.g.: elements such as numerical values, functions, operations, and components), and the terms are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" refer to all of the following cases:

(1) including at least one A, (2) including at least one B, or (3) including at least one A and at least one B.

In addition, the expressions "first," "second" and the like used in the disclosure may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Figure 2:
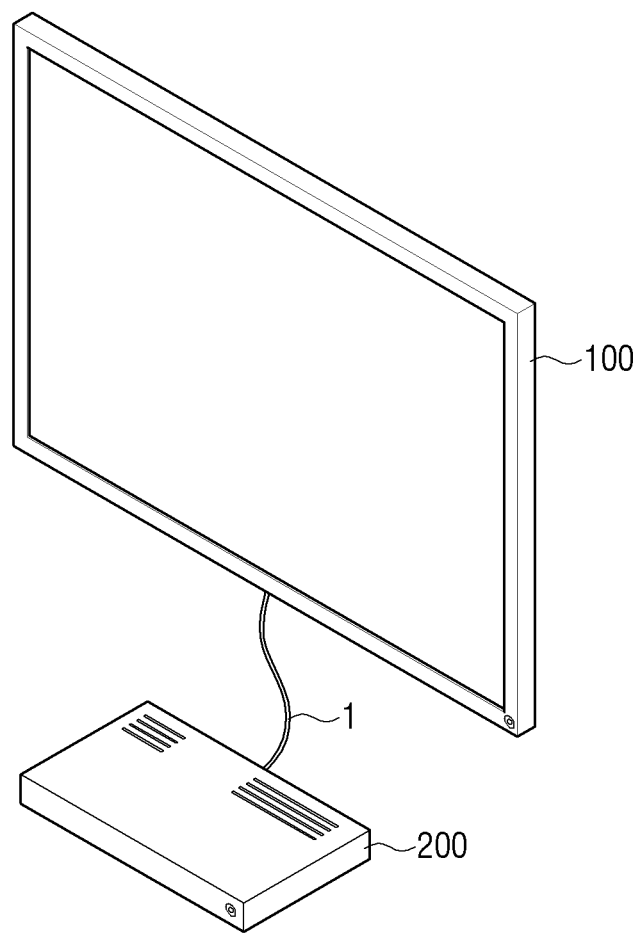
FIG. 2 is an exemplary diagram of a display system according to an embodiment of the disclosure.

FIG. 2 is an exemplary diagram of a display system according to an embodiment of the disclosure.

According to FIG. 2, the display system 10 includes a display apparatus 100 and an electronic device 200. The display apparatus 100 and the electronic device 200 are connected through an optical cable 1 and may transmit and receive information by an optical communication method.

Specifically, each of the display apparatus 100 and the electronic device 200 may convert an electronic signal into an optical signal and transmit the optical signal to another device or reconvert the optical signal received from the another device into an electronic signal.

In particular, the electronic device 200 may convert at least one signal among an image signal and a sound signal which are electronic signals into an optical signal and transmit the optical signal to the display apparatus 100. The electronic device 100 may be connected to an external device such as a set top box or an external hard disk, a flash memory, etc. or connected to an external network such as an Internet network, a cable network, etc. and receive various kinds of contents or information. Also, the electronic device 200 may convert the received various kinds of contents or information into an optical signal and transmit the optical signal to the display apparatus 100 through the optical cable 1. Depending on embodiments, the electronic device 200 may be implemented as a set top box.

The display apparatus 100 may be implemented as various apparatuses having a display function such as a TV, an electronic picture frame, a monitor, a mobile phone, an electronic board, an electronic table, etc., and may convert an optical signal received from the electronic device 200 into at least one signal among an image signal and a sound signal which are electronic signals again, and output the signal.

Here, when an optical signal is received from the electronic device 200 through the optical cable 1, the display apparatus 100 may measure the strength of the received optical signal, and perform an operation related to the state of the optical cable 1 based on the measured strength of the optical signal. For example, the display apparatus 100 may control the strength of transmission of the optical signal of the electronic device 200 based on the measured strength of the optical signal, and output a notification indicating that the optical cable 1 is defective.

Accordingly, the display apparatus 100 may increase the strength of transmission of the optical signal of the electronic device 200 based on the measured strength of the optical signal, and thereby compensate automatically the phenomenon of cracking of an image or breaking-up of a sound that occurs as the optical cable 1 is bent by an angle greater than a limit angle. Also, the display apparatus 100 may determine the defect of the optical cable 1 based on the measured strength of the optical signal and output a notification, and thereby prevent a user from misunderstanding the defect of the optical cable 1 as the breakdown of the display apparatus 100.

Meanwhile, the optical cable 1 may be a transparent or translucent cable, but is not limited thereto.

Figure 3A:
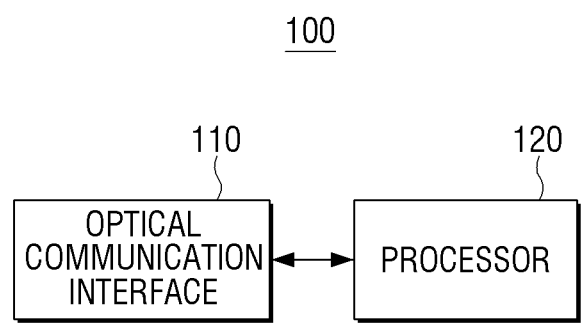
FIG. 3A to FIG. 3C are block diagrams of a display apparatus according to the embodiments of the disclosure.

FIG. 3A is a block diagram of the display apparatus 100 according to an embodiment of the disclosure. According to FIG. 3A, the display apparatus 100 includes an optical communication interface 110 and a processor 120.

The optical communication interface 110 performs communication with the electronic device 200 through the optical cable 1. Specifically, the optical communication interface 110 may convert an electronic signal into an optical signal or convert an optical signal into an electronic signal.

In particular, the optical communication interface 110 may convert an optical signal received from the electronic device 200 into at least one signal among an image signal and a sound signal which are electronic signals. Also, the optical communication interface 110 may convert a control signal for increasing the strength of transmission of an optical signal of the electronic device 200 that will be described below into an optical signal.

For this, the optical communication interface 110 may include a signal converter (not shown) that converts between an electronic signal and an optical signal and an optical cable connection terminal (not shown) to which the optical cable 1 is connected.

Here, the signal converter (not shown) may include a vertical cavity surface emitting laser (VCSEL) and a photo diode (PD). A VCSEL is a laser diode that converts an electronic signal into an optical signal, and a photo diode is a kind of optical sensor that converts an optical signal into an electronic signal.

The processor 120 controls the overall operations of the display apparatus 100. For this, the processor 120 may include one or more of a central processing unit (CPU), a controller, an application processor (AP) or a communication processor (CP), an ARM processor, and a micom.

In particular, if an optical signal including at least one signal among an image signal and a sound signal is received from the electronic device 200 through the optical communication interface 110, the processor 120 may measure the strength of the received optical signal.

For example, the processor 120 may measure the received signal strength index (RSSI) of an optical signal received through the optical communication interface 110, but the disclosure is not limited thereto. Meanwhile, for the processor 120 to measure the RSSI of a received optical signal, various known technologies may be used, and as a detailed content in this regard will be off the gist of the disclosure, explanation in this regard will be omitted.

Accordingly, the processor 120 may control the operation of the display apparatus 100 related to the state of the optical cable 1 based on the measured strength of the optical signal.

For example, in case the measured strength of the optical signal is smaller than a first threshold value, the processor 120 may transmit a control signal for increasing the strength of transmission of the optical signal of the electronic device 200 to the electronic device 200. Here, the processor 120 may transmit a control signal through the optical communication interface 110, but the disclosure is not limited thereto.

Here, the first threshold value is the minimum strength of an optical signal that can be output without a problem when the optical signal is converted into an electronic image or sound signal and output at the display apparatus 100, and the strength of the optical signal measured in a normal situation is measured to be higher than the first threshold value. Meanwhile, in case the strength of the received optical signal is measured to be smaller than the first threshold value due to excessive bending of the optical cable 1 and the like, the phenomenon of cracking of an image or breaking-up of a sound occurs. The first threshold value may be, for example, 350 mV, but is not limited thereto, and it is obvious that the value can be set to any different values by the designer of the display apparatus 100 through theoretical and experimental methods.

When a control signal for increasing the strength of transmission of the optical signal is received, the electronic device 200 transmits the optical signal by increasing the strength of transmission according to the control signal.

Meanwhile, even in case the measured strength of the optical signal is smaller than the first threshold value, that is, even in case breaking-up occurs in an image or a sound, a control signal can be transmitted to the electronic device 200 correctly, and a person skilled in the art would be able to obviously understand that the reason for this is that the amount of data for a control signal is very small compared to a multimedia signal like an image or a sound, and it is okay to use only an extremely low bandwidth.

In case the strength of the received optical signal is measured to be smaller than the first threshold value as above, the processor 120 may transmit a control signal increasing the strength of transmission of the optical signal to the electronic device 200 and thereby increase the strength of transmission of the optical signal of the electronic device 200. Accordingly, the phenomenon that the strength of the optical signal decreases due to bending of the optical cable 1 and an image or a sound breaks up can be automatically compensated.

Meanwhile, the processor 120 may gradually increase the strength of transmission of an optical signal of the electronic device 200. For example, the processor 120 may measure the strength of the received optical signal in real time by a method of, in case the strength of the received optical signal is smaller than the first threshold value, transmitting a control signal for increasing the strength of transmission of the optical signal of the electronic device 200 by the size of one unit to the electronic device 200, and as a result of remeasuring the strength of the received optical signal later, in case the strength is still smaller than the first threshold value, transmitting a control signal for increasing the strength of transmission of the optical signal of the electronic device 200 by the size of two units to the electronic device 200, and transmit control signals until the measured strength of the optical signal becomes greater than or equal to the first threshold value.

Meanwhile, the optical communication interface 110 may include a plurality of channels. That is, the optical cable may include a plurality of optical fibers, and depending on embodiments, each optical fiber may constitute a plurality of channels.

The processor 120 may measure the strength of the optical signals of each of the plurality of channels, sum up the measured strength of the optical signals of each of the plurality of channels, and control the operation of the display apparatus 100 based on the summed up strength of the optical signals. For example, in case the summed up strength of the optical signals is smaller than the first threshold value, the processor 120 may transmit a control signal for increasing the strength of transmission of the optical signal of the electronic device 200 to the electronic device 200. In this case, the electronic device 200 may transmit the optical signals by increasing the strength of transmission by the size according to the control signal for each of the plurality of channels.

Meanwhile, depending on embodiments, the processor 120 may measure the strength of the optical signals of each of the plurality of channels, and only for channels of which strength of the optical signals are smaller than the first threshold value among the strength of the optical signals of each channel, the processor 120 may transmit a control signal for increasing the strength of transmission of the optical signals to the electronic device 200. In this case, the control signal should further include information on channels of which strength of transmission of the optical signals will be increased, and the electronic device 200 will increase only the strength of transmission of the optical signals of the channels included in the control information.

Figure 3B:
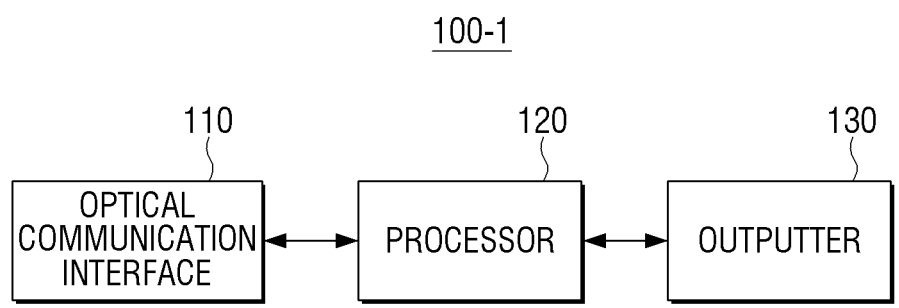

FIG. 3B is a block diagram of a display apparatus 100-1 according to another embodiment of the disclosure. According to FIG. 3B, the display apparatus 100-1 includes an optical communication interface 110, a processor 120, and an outputter 130. The components in FIG. 3B are different in that the outputter 130 is further included compared to the components in FIG. 3A. Accordingly, FIG. 3B will be explained focused on the outputter 130 and the operation of the processor 120 related to the outputter 130, and explanation overlapping with the explanation made with respect to FIG. 3A will be omitted.

The outputter 130 may output a light, an image, or a sound according to control of the processor 120. In particular, the outputter 130 may output a notification indicating that the optical cable is defective. Here, a notification may be output in forms such as flickering of a light emitting diode, outputting of a warning sound, displaying of a message, outputting of a guide sentence, etc., but is not limited thereto.

For this, the outputter 130 may be implemented as a light emitting diode, a display panel, or a speaker. A light emitting diode may be at least one LED or OLED. A display panel may be implemented as display panels in various forms such as a liquid crystal display (LCD), organic light emitting diodes (OLEDs), a plasma display panel (PDP), etc., and it may also be implemented in the form of a touch screen including a touch panel.

According to an embodiment of the disclosure, in case the measured strength of an optical signal is smaller than the second threshold value, the processor 120 may output a notification indicating that the optical cable is defective through the outputter 130. Here, the second threshold value is a value smaller than the first threshold value, and in general, it may be the strength of an optical signal that may be measured in case a defect occurred in the optical cable 1 itself. The second threshold value may be, for example, 200 mV, but is not limited thereto, and it is obvious that the value can be set to any different values by the designer of the display apparatus 100 through theoretical and experimental methods.

That is, if the measured strength of the optical signal is smaller than the second threshold value, the processor 120 may determine that the optical cable 1 itself broke down or is defective, and control the outputter 130 to output a notification indicating that the optical cable is defective.

Depending on embodiments, in case the measured strength of the optical signal is smaller than the second threshold value, the processor 120 may flicker a light emitting diode, display a warning message or a replacement guide on the display panel, output a warning sound through the speaker, or output a warning message or a replacement guide as a voice.

Accordingly, a user may not misunderstand the breakdown of the optical cable 1 as the breakdown of the display apparatus 100 itself, and may process a problem due to a defect in the optical cable 1 itself simply and correctly like replacing the optical cable 1.

Meanwhile, according to another embodiment of the disclosure, in case the strength of an optical signal measured after transmitting a control signal for increasing the strength of transmission of the optical signal to the electronic device 200 is identical to the strength of the optical signal measured before transmitting a control signal for increasing the strength of transmission of the optical signal to the electronic device 200, the processor 120 may determine that the optical cable 1 is defective.

That is, as described above, in case the strength of an optical signal was measured to be smaller than the first threshold value (or smaller than the first threshold value and greater than or equal to the second threshold value depending on embodiments), and the processor 120 transmitted a control signal for increasing the strength of transmission of the optical signal to the electronic device 200, but there was no change in the strength of the optical signal measured afterwards, it is highly likely that the optical cable 1 itself broke down or a defect occurred. Thus, the processor 120 may determine that the optical cable 1 is defective.

Accordingly, the processor 120 may output a notification indicating that the optical cable 1 is defective, as described above.

Figure 3C:
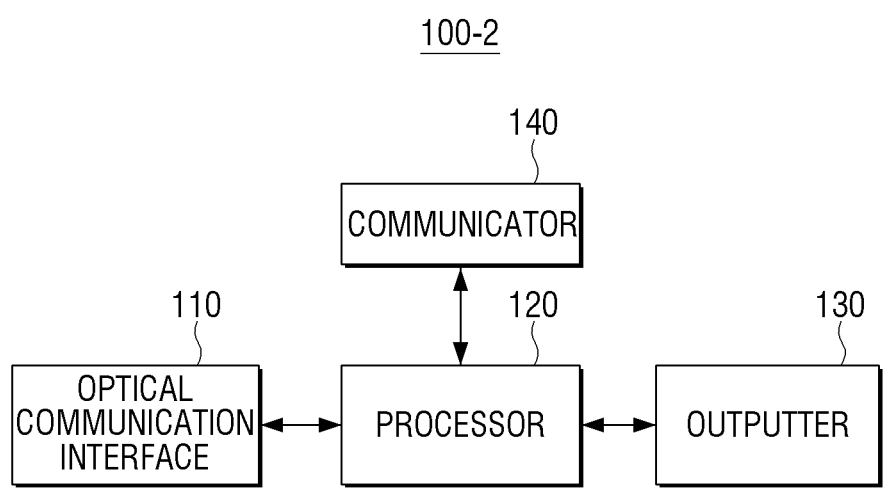

FIG. 3C is a block diagram of a display apparatus 100-2 according to still another embodiment of the disclosure. According to FIG. 3C, the display apparatus 100-2 includes an optical communication interface 110, a processor 120, an outputter 130, and a communicator 140. The components in FIG. 3C are different in that the communicator 140 is further included compared to the components in FIG. 3B. Accordingly, FIG. 3C will be explained focused on the communicator 140 and the operation of the processor 120 related to the communicator 140, and explanation overlapping with the explanation made above will be omitted.

The communicator 140 performs communication with an external device. In particular, the communicator 140 may perform wireless communication with the display apparatus 100-1 or the user terminal apparatus (not shown) of the user of the electronic device 200. Also, in case the electronic device 200-1 includes a separate communicator 240 as in FIG. 4B that will be described below, the communicator 140 may perform communication with the electronic device 200-1.

For this, the communicator 140 may include at least one communication module among a near field wireless communication module (not shown) and a wireless LAN communication module (not shown). Here, a near field wireless communication module (not shown) is a communication module performing data communication with an external apparatus located within a short distance wirelessly, and it may be, for example, a Bluetooth module, a Zigbee module, an NFC module, etc. Also, a wireless LAN communication module (not shown) is a module that is connected to an external network according to a wireless communication protocol such as WiFi, IEEE, etc., and performs communication. In addition to the above, the communicator 140 may further include mobile communication modules that are connected to a mobile communication network according to various mobile communication standards such as 3rd Generation (3G), 3rd Generation Partnership Project (3GPP), Long Term Evolution (LTE), etc., and perform communication.

According to an embodiment of the disclosure, in case the measured strength of an optical signal is smaller than the second threshold value, the processor 120 may control the communicator 140 to transmit a message informing that the optical cable 1 is defective to a user terminal apparatus (not shown).

That is, in case the processor 120 determined a defect of the optical cable 1, the processor 120 may output a notification indicating that the optical cable 1 is defective through the outputters 130 provided on the display apparatuses 100-1, 100-2. However, in the case of an embodiment wherein the display apparatus 100-2 includes a separate communicator 140, an embodiment of transmitting a message informing the defect of the optical cable 1 to a user terminal through the communicator 140 may also be possible.

Figure 4A:
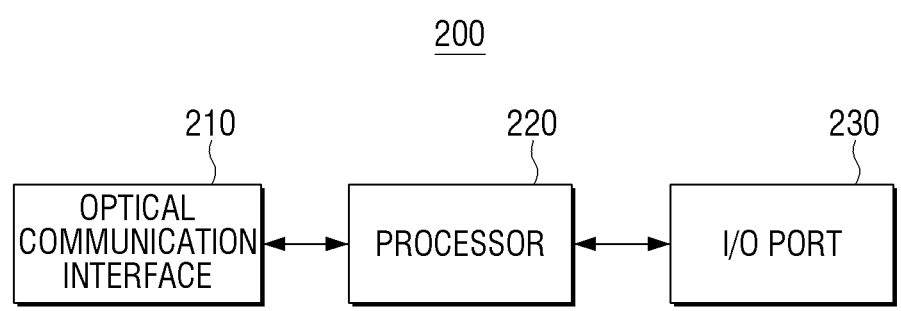
FIG. 4A and FIG. 4B are block diagrams of an electronic device according to the embodiments of the disclosure.
Figure 4B:
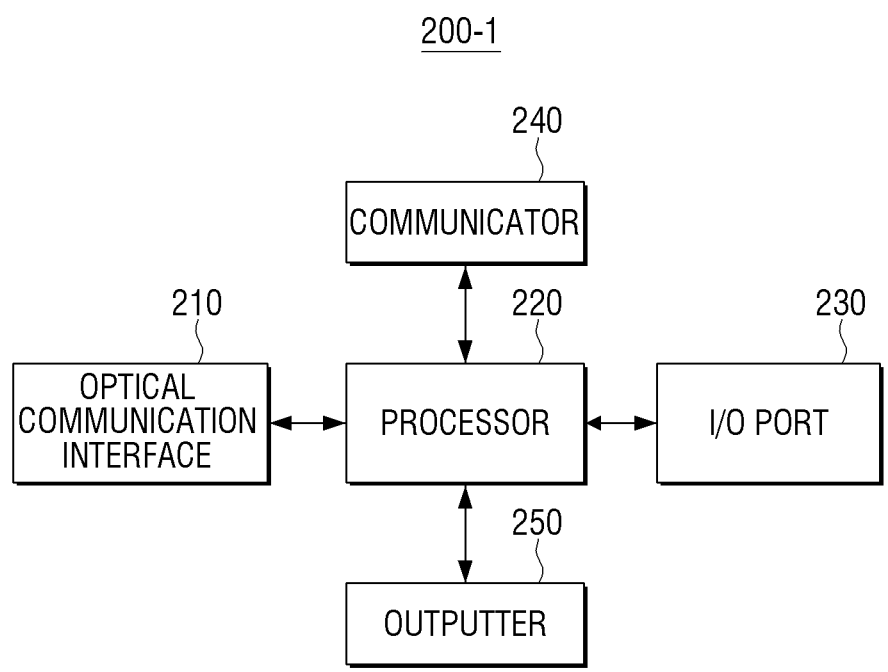

Meanwhile, according to other embodiments, in case the electronic device 200-1 includes a communicator 240 as in FIG. 4B, the processor 120 may transmit a control signal for increasing the strength of transmission of an optical signal described above to the electronic device 200-1 through the communicator 140, but not the optical communication interface 110.

Also, in case the electronic device 200-1 includes an outputter 250 as in FIG. 4B, the processor 120 may transmit a control signal making a notification indicating that the optical cable 1 is defective described above output at the outputter 250 of the electronic device 200-1 to the electronic device 200-1 through the communicator 140. In this case, at the outputter 250 of the electronic device 200-1, a notification indicating that the optical cable 1 is defective may also be output.

FIG. 4A is a block diagram of the electronic device 200 according to an embodiment of the disclosure. According to FIG. 4A, the electronic device 200 includes an optical communication interface 210, a processor 220, and an I/O port 230.

The optical communication interface 210 performs communication with the display apparatuses 100, 100-1, 100-2 through the optical cable 1. Specifically, the optical communication interface 210 may convert an electronic signal into an optical signal or convert an optical signal into an electronic signal.

In particular, the optical communication interface 210 may convert at least one signal among an image signal and a sound signal which are electronic signals into an optical signal. Also, the optical communication interface 210 may convert a control signal in the form of an optical signal received from the display apparatus 100 into an electronic signal.

For this, the optical communication interface 210 may include a signal converter (not shown) that converts between an electronic signal and an optical signal and an optical cable connection terminal (not shown) to which the optical cable 1 is connected. Here, the signal converter (not shown) may include a vertical cavity surface emitting laser (VCSEL) and a photo diode (PD). A VCSEL is a laser diode that converts an electronic signal into an optical signal, and a photo diode is a kind of optical sensor that converts an optical signal into an electronic signal.

The I/O port 230 includes various kinds of I/O ports. Accordingly, the electronic device 200 may be connected to various kinds of external apparatuses such as an antenna, a set top box, an external hard disk, a flash memory, etc. or various kinds of external networks such as an Internet network, a cable network, etc. through the I/O port 230.

For this, the I/O port 230 may include at least one interface satisfying various kinds of standards such as a Composite, a Separate (S) Video, a Component, a D-Sub, an HDMI, a Digital Visual Interface (DVI), a Sony Philips Digital Interface (S/PDIF), etc. Also, the I/O port 230 may include at least one among wired communication modules (not shown) such as a High-Definition Multimedia Interface (HDMI), a Universal Serial Bus (USB), Institute of Electrical and Electronics Engineers (IEEE) 1394, RS-232, etc.

The processor 220 controls the overall operations of the electronic device 200. For this, the processor 220 may include one or more of a central processing unit (CPU), a controller, an application processor (AP) or a communication processor (CP), an ARM processor, and a micom.

The processor 220 may perform optical communication with the display apparatus 100 through the optical communication interface 210, and perform communication with various kinds of external apparatuses or external networks by methods according to the corresponding standards through the I/O port 230, and thereby relay communication between the display apparatus 100 and various kinds of external apparatuses or external networks.

For example, when the processor 220 is connected to a set top box through the I/O port 230 and receives a video signal and an audio signal from the set top box, the processor 220 may convert the video signal and the audio signal into an optical signal through the optical communication interface 210 and transmit the signal to the display apparatus 100.

Also, the processor 220 may operate according to a control signal received from the display apparatus 100. Specifically, the processor 220 may receive a control signal in the form of an optical signal from the display apparatus 100 through the optical communication interface 210, and convert the received control signal into an electronic signal. Accordingly, the processor 220 may perform an operation according to the control signal. For example, in case a control signal for increasing the strength of transmission of an optical signal was received from the display apparatus 200, the processor 220 may increase the strength of the optical signal transmitted to the display apparatus 100 according to the received control signal.

FIG. 4B is a block diagram of the electronic device 200-1 according to another embodiment of the disclosure. According to FIG. 4B, the electronic device 200-1 includes an optical communication interface 210, a processor 220, an I/O port 230, a communicator 240, and an outputter 250. The components in FIG. 4B are different in that the communicator 240 and the outputter 250 are further included compared to the components in FIG. 4A. Accordingly, FIG. 4B will be explained focused on the communicator 240, the outputter 250, and the operations of the processor 120 related to them, and explanation overlapping with the explanation made above will be omitted.

The communicator 240 performs communication with external apparatuses by various kinds of methods. In particular, the communicator 240 may perform wireless communication with the display apparatus 100-2.

For this, the communicator 240 may include at least one communication module among a near field wireless communication module (not shown) and a wireless LAN communication module (not shown). Here, a near field wireless communication module (not shown) is a communication module performing data communication with an external apparatus located within a short distance wirelessly, and it may be, for example, a Bluetooth module, a Zigbee module, an NFC module, etc. Also, a wireless LAN communication module (not shown) is a module that is connected to an external network according to a wireless communication protocol such as WiFi, IEEE, etc., and performs communication. In addition to the above, the communicator 240 may further include mobile communication modules that are connected to a mobile communication network according to various mobile communication standards such as 3rd Generation (3G), 3rd Generation Partnership Project (3GPP), Long Term Evolution (LTE), etc., and perform communication.

The outputter 250 may output a light, an image, or a sound according to control of the processor 220. In particular, the outputter 250 may output a notification indicating that the optical cable is defective. Here, a notification may be output in forms such as flickering of a light emitting diode, outputting of a warning sound, displaying of a message, outputting of a guide sentence, etc., but is not limited thereto.

For this, the outputter 250 may be implemented as a light emitting diode, a display panel, or a speaker. A light emitting diode may be at least one LED or OLED. A display panel may be implemented as display panels in various forms such as a liquid crystal display (LCD), organic light emitting diodes (OLEDs), a plasma display panel (PDP), etc., and it may also be implemented in the form of a touch screen including a touch panel.

When a control signal for increasing the strength of transmission of an optical signal is transmitted from the display apparatus 100-2 through the communicator 240, the processor 220 may increase the strength of transmission of the optical signal according to the control signal received through the communicator 240.

Also, when a control signal making a notification indicating that the optical cable 1 is defective described above output is received from the display apparatuses 100, 100-1, 100-2 through the optical communication interface 210 or the communicator 240, the processor 240 may control the outputter 250 to output a notification indicating that the optical cable 1 is defective according to the control signal.

Meanwhile, in the above, a case wherein the electronic devices 200, 200-1 increase the strength of transmission of an optical signal or output a notification indicating that the optical cable 1 is defective according to a control signal transmitted by the display apparatuses 100, 100-1, 100-2 was suggested as an example, but the embodiments of the disclosure are not limited thereto. Hereinafter, other embodiments will be explained.

According to another embodiment of the disclosure, the display apparatuses 100, 100-1, 100-2 may transmit information on the strength of an optical signal that the display apparatuses 100, 100-1, 100-2 received from the electronic devices 200, 200-1 through the optical communication interface 110 to the electronic devices 200, 200-1 in real time through the optical communication interface 110 or the communicator 140.

Accordingly, the processor 220 may perform an operation related to the state of the optical cable 1 based on the information on the strength of the optical signal received from the display apparatuses 100, 100-1, 100-2.

Specifically, in case the strength of the optical signal received at the display apparatuses 100, 100-1, 100-2 is smaller than the first threshold value, the processor 220 may increase the strength of the optical signal transmitted to the display apparatuses 100, 100-1, 100-2.

Also, in case the strength of the optical signal received at the display apparatuses 100, 100-1, 100-2 is smaller than the second threshold value, the processor 220 may control the outputter 250 to output a notification indicating that the optical cable 1 is defective.

Here, depending on embodiments, the processor 220 may control the communicator 240 to transmit a control signal making a notification indicating that the optical cable 1 is defective output at the outputters 130 of the display apparatuses 100-1, 100-2 to the display apparatuses 100-1, 100-2.

Meanwhile, after the strength of the optical signal transmitted to the display apparatuses 100, 100-1, 100-2 is increased, in case there is no change in the strength of the optical signal received at the display apparatuses 100, 100-1, 100-2, the processor 220 may determine that the optical cable 1 is defective, and accordingly, the processor 220 may control the outputter 250 to output a notification indicating that the optical cable 1 is defective.

Also, in case the optical communication interface 210 includes a plurality of channels, and information on the strength of optical signals of each of the plurality of channels is received from the display apparatuses 100, 100-1, 100-2, the processor 220 may sum up the strength of the optical signals of each of the plurality of channels and control the operations of the electronic devices 200, 200-1 based on the summed up strength of the optical signals. For example, in case the summed up strength of the optical signals is smaller than the first threshold value, the processor 220 may increase the strength of transmission of the optical signals for all channels.

Also, depending on embodiments, the processor 220 may not sum up the strength of the optical signals of all channels, but increase the strength of transmission of the optical signals only for the channels of which strength of optical signals have strength smaller than the first threshold value.

That is, as described above, in case the electronic devices 200, 200-1 receive information on the strength of optical signals received at the display apparatuses 100, 100-1, 100-2, the processors 220 of the electronic devices 200, 200-1 may directly perform operations related to the state of the optical cable 1 based on the received information.

Figure 5:
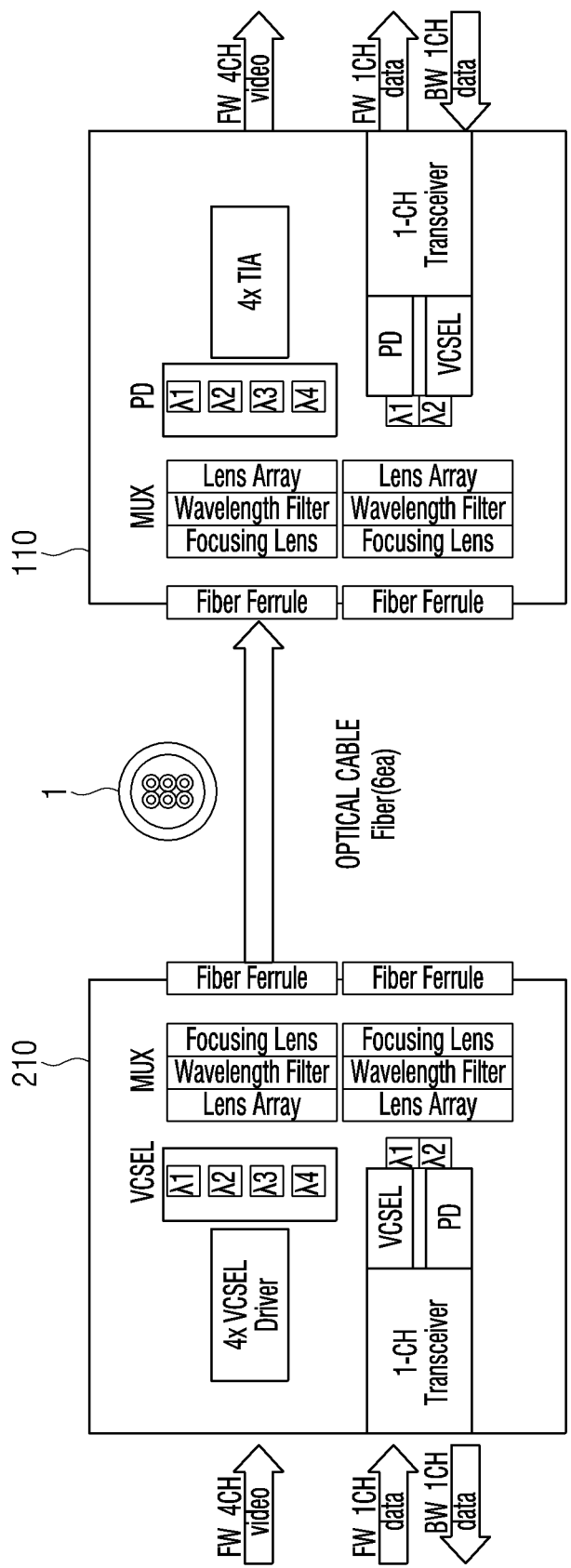
FIG. 5 is an exemplary diagram of optical communication interfaces of an electronic device and a display apparatus according to an embodiment of the disclosure.

FIG. 5 is an exemplary diagram of optical communication interfaces of an electronic device and a display apparatus according to an embodiment of the disclosure. Specifically, FIG. 5 illustrates an example wherein the optical communication interfaces 210 of the electronic devices 200, 200-1 and the optical communication interfaces 110 of the display apparatuses 100, 100-1, 100-2 are connected through the optical cable 1 including six channels.

Referring to FIG. 5, it can be seen that, after video signals of four channels are converted into an optical signal through the VCSEL of the optical communication interface 210, the signal is transmitted to the optical communication interface 110 through the optical cable 1, and at the optical communication interface 110, the optical signal is converted into the video signals of four channels again through the photo diode (PD).

Meanwhile, it can be seen that the remaining two channels are used for transmission and reception of data between the optical communication interfaces 210, 110. Through such channels for transmission and reception of data, various kinds of control signals, etc. may be transmitted and received.

Figure 6A:
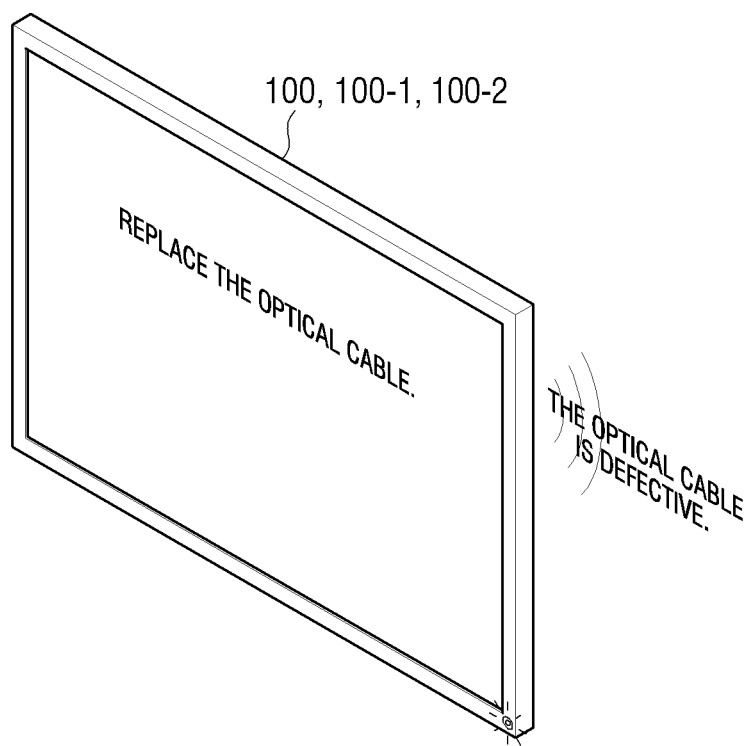
FIG. 6A and FIG. 6B are exemplary diagrams of outputting a notification indicating that an optical cable is defective according to an embodiment of the disclosure.
Figure 6B:
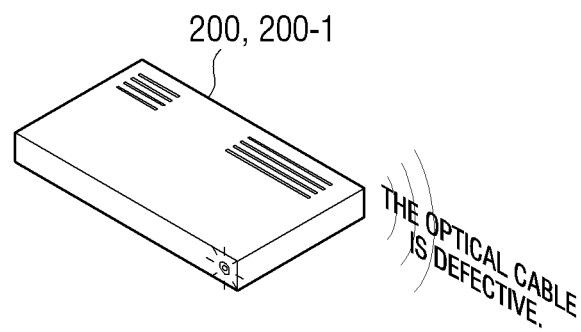

FIG. 6A and FIG. 6B are exemplary diagrams of outputting a notification indicating that the optical cable is defective according to an embodiment of the disclosure. As described above, in case the strength of an optical signal measured at the display apparatuses 100, 100-1, 100-2 is smaller than the second threshold value, a notification indicating that the optical cable 1 is defective may be output, and FIG. 6A illustrates an example wherein a notification is output at the display apparatuses 100, 100-1, 100-2, and FIG. 6B illustrates an example wherein a notification is output at the electronic devices 200, 200-1.

Figure 7:
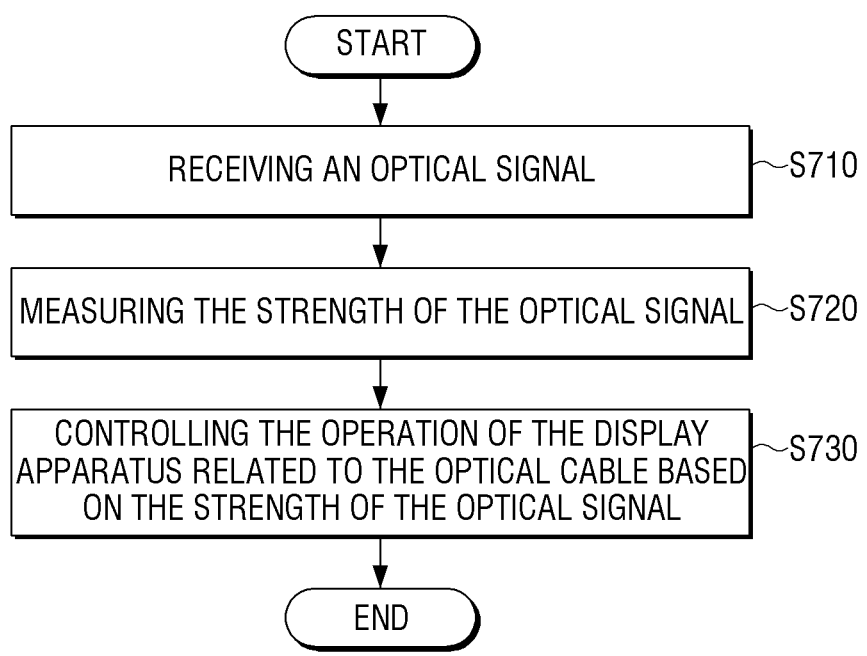
FIG. 7 is a flow chart of a control method for a display apparatus according to an embodiment of the disclosure.

FIG. 7 is a flow chart of a control method for a display apparatus according to an embodiment of the disclosure. According to FIG. 7, the display apparatuses 100, 100-1, 100-2 receive an optical signal including at least one signal among an image signal and a sound signal from the electronic devices 200, 200-1 at operation S710, and measure the strength of the received optical signal at operation S720.

Afterwards, the display apparatuses 100, 100-1, 100-2 may control the operations of the display apparatuses 100, 100-1, 100-2 related to the state of the optical cable 1 based on the measured strength of the optical signal at operation S730.

For example, in case the measured strength of an optical signal is smaller than the first threshold value, the display apparatuses 100, 100-1, 100-2 may transmit a control signal for increasing the strength of transmission of the optical signal of the electronic devices 200, 200-1 to the electronic devices 200, 200-1.

Also, in case the measured strength of an optical signal is smaller than the second threshold value, the display apparatuses 100-1, 100-2 may output a notification indicating that the optical cable 1 is defective.

Meanwhile, in case the optical communication interface includes a plurality of channels, the display apparatuses 100-1, 100-2 may measure the strength of optical signals of each of the plurality of channels, sum up the measured strength of the optical signals of each of the plurality of channels, and control the operations of the display apparatuses 100-1, 100-2 based on the summed up strength of the optical signals.

Also, in case the strength of an optical signal measured after transmitting a control signal to the electronic devices 200, 200-1 is identical to the strength of the optical signal measured before transmitting a control signal to the electronic devices 200, 200-1, the display apparatuses 100-1, 100-2 may determine that the optical cable 1 is defective, and accordingly, output a notification indicating that the optical cable 1 is defective.

In addition, in case the measured strength of an optical signal is smaller than the second threshold value, the display apparatuses 100-1, 100-2 may transmit a message indicating that the optical cable 1 is defective to the display apparatuses 100-1, 100-2 or the terminal apparatus of the user of the electronic devices 200, 200-1.

Figure 8:
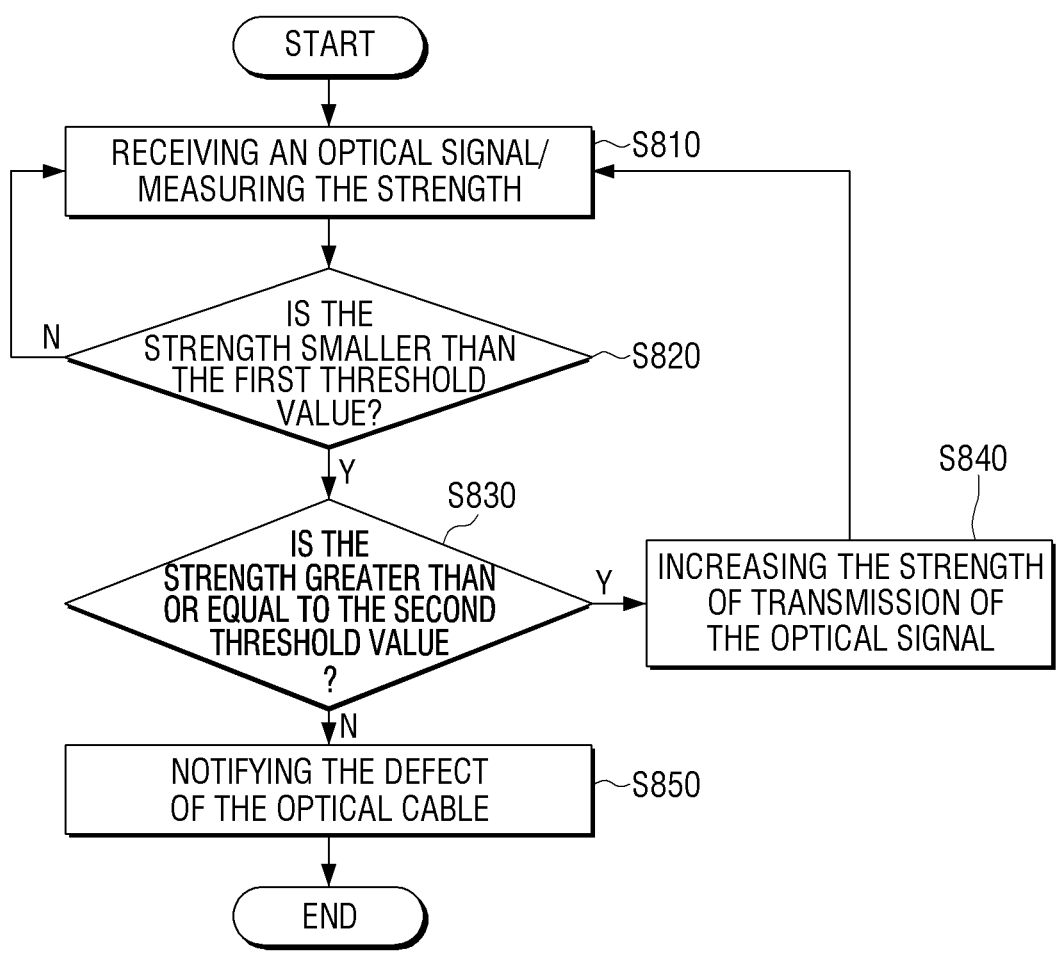
FIG. 8 is a flow chart of a control method for a display apparatus according to another embodiment of the disclosure.

FIG. 8 is a flow chart of a control method for a display apparatus according to another embodiment of the disclosure. According to FIG. 8, the display apparatuses 100-1, 100-2 receive an optical signal including at least one signal among an image signal and a sound signal from the electronic devices 200, 200-1 and measure the strength of the received optical signal at operation S810.

If the measured strength of the optical signal is greater than or equal to the first threshold value at operation S820, N, the display apparatuses 100-1, 100-2 continuously measure the strength of the received optical signal at operation S810.

If the measured strength of the optical signal is smaller than the first threshold value at operation S820, Y, and is greater than or equal to the second threshold value at operation S830, Y, the display apparatuses 100-1, 100-2 transmit a control signal for increasing the strength of transmission of the optical signal to the electronic devices 200, 200-1 and thereby increase the strength of transmission of the optical signal of the electronic devices 200, 200-1 at operation S840, and continuously measure the strength of the received optical signal at operation S810.

If the measured strength of the optical signal is smaller than the second threshold value at operation S830, N, the display apparatuses 100-1, 100-2 output a notification indicating that the optical cable 1 is defective at operation S850.

According to the various embodiments of the disclosure as described above, reduction of the strength of an optical signal according to bending of an optical cable in a display system can be compensated. Also, a defect of an optical cable can be determined.

Meanwhile, the various embodiments of the disclosure may be implemented as software including instructions stored in machine-readable storage media, which can be read by machines (e.g.: computers). The machines refer to apparatuses that call instructions stored in a storage medium, and can operate according to the called instructions, and the apparatuses may include the display apparatuses 100, 100-1, 100-2 and the electronic devices 200, 200-1 according to the embodiments described in the disclosure.

In case an instruction as above is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

According to an embodiment of the disclosure, the method according to the various embodiments described in the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: play store™). In the case of on-line distribution, at least a portion of a computer program product may be stored in a storage medium such as the server of the manufacturer, the server of the application store, and the memory of the relay server at least temporarily, or may be generated temporarily.

Also, each of the components according to the various embodiments (e.g.: a module or a program) may consist of a singular object or a plurality of objects. In addition, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed in a different order or omitted, or other operations may be added.

The descriptions above are merely exemplary explanation of the technical idea of the disclosure, and various amendments and modifications may be made by those having ordinary skill in the technical field to which the disclosure belongs, within the scope of the intrinsic characteristics of the disclosure. Also, the embodiments according to the disclosure are not for limiting the technical idea of the disclosure, but for explaining the technical idea, and the scope of the technical idea of the disclosure is not limited by the embodiments. Accordingly, the scope of protection of the disclosure should be interpreted based on the appended claims, and all technical ideas within an equivalent scope thereto should be interpreted to belong to the scope of protection of the disclosure.

What is claimed is:

1. A display apparatus comprising:
an optical communication interface configured to communicate with an electronic device through an optical cable; and
a processor configured to:
based on an optical signal including at least one signal among an image signal and a sound signal being received from the electronic device through the optical communication interface, measure a strength of the received optical signal, and control an operation of the display apparatus related to a state of the optical cable based on the measured strength of the optical signal,
wherein the processor is further configured to:
based on the measured strength of the optical signal being smaller than a first threshold value, transmit a control signal for increasing a strength of transmission of the optical signal of the electronic device to the electronic device, and
based on the strength of the optical signal measured after transmitting the control signal to the electronic device being identical to the strength of the optical signal measured before transmitting the control signal to the electronic device, determine that the optical cable is defective.

2. The display apparatus of claim 1, further comprising:
an outputter,
wherein the processor is further configured to:
based on the measured strength of the optical signal being smaller than a second threshold value, output a notification indicating that the optical cable is defective through the outputter.

3. The display apparatus of claim 1, further comprising:
an outputter,
wherein the processor is further configured to:
based on the measured strength of the optical signal being smaller than the first threshold value and greater than or equal to a second threshold value, transmit a control signal for increasing a strength of transmission of the optical signal of the electronic device to the electronic device, and
based on the measured strength of the optical signal being smaller than the second threshold value, output a notification indicating that the optical cable is defective through the outputter.

4. A display apparatus comprising:
an optical communication interface configured to communicate with an electronic device through an optical cable; and
a processor configured to:
based on an optical signal including at least one signal among an image signal and a sound signal being received from the electronic device through the optical communication interface, measure a strength of the received optical signal, and control an operation of the display apparatus related to a state of the optical cable based on the measured strength of the optical signal,
wherein the optical communication interface includes a plurality of channels, and
wherein the processor is further configured to:
measure a strength of each of optical signals of the plurality of channels, sum up the measured strength of each of the optical signals of the plurality of channels, and control the operation of the display apparatus based on the summed up strength of each of the optical signals.

5. The display apparatus of claim 1, comprising:
a communicator configured to communicate with a user terminal apparatus,
wherein the processor is further configured to:
based on the measured strength of the optical signal being smaller than a second threshold value, control the communicator to transmit a message informing that the optical cable is defective to the user terminal apparatus.

6. A method for controlling a display apparatus comprising an optical communication interface configured to communicate with an electronic device through an optical cable, the method comprising:
receiving an optical signal including at least one signal among an image signal and a sound signal from the electronic device;
measuring a strength of the received optical signal; and
controlling an operation of the display apparatus related to a state of the optical cable based on the measured strength of the optical signal,
wherein the controlling comprises:
based on the measured strength of the optical signal being smaller than a first threshold value, transmitting a control signal for increasing a strength of transmission of the optical signal of the electronic device to the electronic device, and
based on the strength of the optical signal measured after transmitting the control signal to the electronic device being identical to the strength of the optical signal measured before transmitting the control signal to the electronic device, determining that the optical cable is defective.

7. The method of claim 6,
wherein the controlling comprises:
based on the measured strength of the optical signal being smaller than a second threshold value, outputting a notification indicating that the optical cable is defective.

8. The method of claim 6,
wherein the controlling comprises:
based on the measured strength of the optical signal being smaller than the first threshold value and greater than or equal to a second threshold value, transmitting a control signal for increasing a strength of transmission of the optical signal of the electronic device to the electronic device, and based on the measured strength of the optical signal being smaller than the second threshold value, outputting a notification indicating that the optical cable is defective.

9. A method for controlling a display apparatus comprising an optical communication interface configured to communicate with an electronic device through an optical cable, the method comprising:
receiving an optical signal including at least one signal among an image signal and a sound signal from the electronic device;
measuring a strength of the received optical signal; and
controlling an operation of the display apparatus related to a state of the optical cable based on the measured strength of the optical signal,
wherein the optical communication interface includes a plurality of channels, and
wherein the measuring comprises:
measuring a strength of each of optical signals of the plurality of channels, and summing up the measured strength of each of the optical signals of the plurality of channels, and
wherein the controlling comprises:
controlling the operation of the display apparatus based on the summed up strength of each of the optical signals.

10. The method of claim 6,
wherein the controlling comprises:
based on the measured strength of the optical signal being smaller than a second threshold value, transmitting a message informing that the optical cable is defective to a user terminal apparatus.

11. A display system comprising:
an electronic device which converts at least one signal among an image signal and a sound signal into an optical signal, and transmits the converted optical signal to a display apparatus through an optical cable; and
a display apparatus which, based on receiving the converted optical signal from the electronic device through the optical cable, converts the received optical signal and outputs at least one signal among the image signal and the sound signal,
wherein the display apparatus is configured to:
based on receiving the optical signal, measure a strength of the received optical signal, and perform an operation related to a state of the optical cable based on the measured strength of the optical signal, and
wherein the display apparatus is further configured to:
based on the measured strength of the optical signal being smaller than a first threshold value, transmit a control signal for increasing a strength of transmission of the optical signal of the electronic device to the electronic device, and based on the strength of the optical signal measured after transmitting the control signal to the electronic device being identical to the strength of the optical signal measured before transmitting the control signal to the electronic device, determine that the optical cable is defective.

\* \* \* \* \*